2,713,967

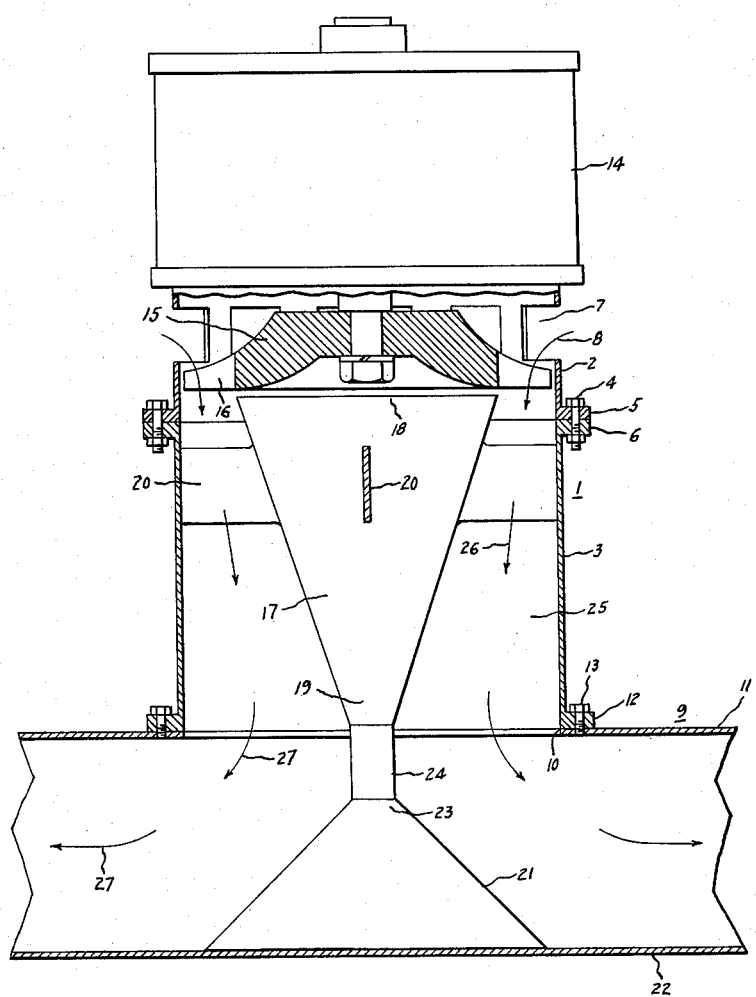

VENTILATING DEVICE

Fred B. Schneider and Anthony C. Siciliano, Wesleyville, Pa., assignors to General Electric Company, a corporation of New York Application June 11, 1952, Serial No. 292,804

3 Claims. (Cl. 230—47)

This invention relates to ventilating devices and more particularly to a device arranged to change the direction of a flow of gaseous medium by substantially 90 degrees without a drop in static pressure.

In the design of certain ventilating systems, for example, in self-propelled vehicles such as diesel-electric locomotives, it is desirable to utilize axial flow blowers mounted in the vehicle cab to furnish ventilating air for cooling the traction motors. This arrangement requires that the air discharged from the blower make a right-angle turn into a duct arranged under the vehicle body floor, and in the past it has not been possible to force the air around this bend without a major pressure drop. This pressure drop has resulted in a marked reduction in ventilating efficiency and has required therefore the use of excessively large blowers and driving motors. It is desirable, therefore, that a ventilating system be provided wherein the air from an axial flow blower is deflected at right angles into a duct without any drop in static pressure.

An object of this invention is therefore to provide an improved ventilating system incorporating the desirable feature pointed out above.

Further objects and advantages of this invention will become apparent and the invention will be better understood by reference to the following description and the accompanying drawing, and the features of novelty which characterize this invention will be pointed out with particularity in the claims annexed to and forming a part of this specification.

This invention in its broadest aspects provides a first duct member adapted to have an axial flow of gaseous medium, for example, air, therein and a second duct member arranged at right angles to the first duct member and communicating therewith, so that the gas flows from the first duct member into the second duct member, thereby making a right angle turn. In order to prevent a drop in static pressure at the bend, a first conical member is arranged in the first duct and spaced from the interior wall thereof. This conical member has its apex end facing toward the second duct member so that the gas is decelerated, in flowing toward the second duct. A second substantially conical member is arranged in the second duct member coaxial with the first conical member and having its apex end facing toward the first conical member. This conical member facilitates the change in direction of the gas into the second duct member and the gas further decelerates on entering the second duct member to produce a static pressure recovery. More specifically, the first duct member may be cylindrical in form and have a plurality of openings formed in its circumferential surface adjacent one end, with the other duct member communicating with the other end. An axial flow blower may be arranged in the cylindrical duct member intermediate the openings therein and the end communicating with the other duct member and a motor may be arranged to close the upper end of the cylindrical duct member and connected to drive the axial flow blower. The first conical member is then arranged with its base adjacent the blower and its apex end facing toward the second duct member and connected to the apex end of the second conical member, which in turn has its base resting on the interior wall of the second duct member remote from the cylindrical duct member.

The single figure of the drawing is a side elevational view, partly in section, illustrating the improved ventilating system of this invention.

In the drawing, a vertically arranged cylindrical duct member 1 is provided having an upper section 2 and a lower section 3 connected by suitable bolts 4 engaging flanges 5 and 6. A plurality of openings 7 are formed in the circumferential surface of the upper section 2 of the duct member 1, so that a gaseous medium, such as air, may be admitted to the interior of the duct, as shown by the arrows 8. A second horizontally arranged duct member 9 is provided, having an opening 10 formed in its upper wall 11, communicating with the interior of the lower section 3 of the cylindrical duct member 1. The lower section 3 of the duct member 1 is secured to the upper wall 11 of duct member 9 by means of a flange 12 and bolts 13.

The upper section 2 of the cylindrical duct member 1 supports a suitable driving motor 14 which in turn is connected to drive an axial flow blower 15. The blower 15 is arranged in the upper section 2 of the cylindrical duct member 1 with its blades 16 on the side of the openings 7 remote from the motor 14. In order to deflect the air from the cylindrical duct member 1 into the other duct member 11 while maintaining static pressure, a first conical member 17 is arranged in the duct member 1 with its base 18 which has a cross-sectional area approximately half as great as that of the duct member 1, being positioned adjacent the axial flow blower 15 and its apex end 19 which has a cross-sectional area substantially less than a tenth of the cross-sectional area of the duct 1 facing toward the duct 9. The conical member 17 is supported from the lower section 3 of cylindrical duct member 1 by a plurality of thin axial vanes shown as the supporting members 20 adapted to reduce any swirling motion of air initiated by the blower 15. Another conical member 21 is arranged in the other duct member 11 with its base resting on the bottom wall 22 of the duct member 9 and its apex end 23 extending toward the first conical member 17. The conical member 21 has its apex end 23 within the duct member 9 and has its outer surface at an angle of approximately 45 degrees to the axis of the conical member 21 (as shown) to reduce any turbulence which might otherwise develop. As shown, the area of the conical surface generated by a line perpendicular to the outer surface of the conical member 21 which passes through the edge of the opening 10 is approximately 20% larger than the cross-sectional area of the cylindrical duct 1 to provide a continuously expanding duct for the passage of the air as shown by arrows 27 during the deflection of the air so that the air is continuously decelerated thereby. The apices 19 and 23 of conical members 17 and 21 may respectively be connected by a cylindrical member 24. It will be readily seen that conical member 17 is concentric with cylindrical duct 1 and coaxial with the other conical member 21.

In operation, air is drawn into the cylindrical duct member 1 through the openings 7 by axial flow blower 15, as shown by the arrows 8, and thus enters the annular space between the interior walls of the cylindrical duct 1 and the conical member 17 at a predetermined pressure. It will be seen that the conical member 17 defines an annular divergent passage 25 with the interior walls of the cylindrical duct 1, thus causing substantial deceleration of the air flow as indicated by the arrows 26. This deceleration is on the order of 2 to 1, as clearly shown by a comparison of the cross sectional area through which the gas passes at the base of the conical member 17 and at the exhaust port opening which mates with the opening 10 in the duct member 9. The lower conical member 21 facilitates a 90 degree bend of the air into the duct 9, as shown by the arrows 27, and the air enters the large lower duct 9 with an additional decelerating effect. The result is a reconversion of kinetic energy into static pressure with the final effect that the air flows within the duct 9 with no loss in static pressure, and possibly even with a higher static pressure than it had when it was discharged by the blower 15. This phenomenon is readily explained by reference to Bernoulli's theorem, in which it is stated that the sum of pressure energy, potential energy, and kinetic energy equals a constant. Here, with potential energy remaining constant and kinetic energy being reduced by virtue of the deceleration of the air flow, static pressure must necessarily increase in the lower section 3 of the duct 1 in order to maintain the constant product of the equation. In the region of the deflection, the space around the conical member 21 between the opening 10 and radial flow in the duct 9, kinetic energy is converted to potential or heat energy and pressure energy. However, the increasing volume of the radial air flow in the duct 9 as the air leaves the region of deflection will further decelerate the air to produce a static pressure recovery to a value substantially the same as the initial pressure in the upper section 2.

In a device actually constructed, it was found that the static head of the fan alone was 1.135 in. of water, while the static head of the output flowing in the duct 9 was 1.20 in. of water, or a pressure recovery of .065 in. of water for a flow of 3010 cu. ft. per minute.

While the above description has referred to an air ventilating system, it will be readily apparent that the system is equally applicable to any gaseous medium. It will also be seen that since this construction not only eliminates a pressure drop in deflecting the gaseous medium around the 90-degree bend, but may even provide a static pressure recovery, a much smaller driving motor is needed to provide the same volume of air flow. Thus, the entire device may be small in size for a given air volume compared with previous blower arrangements. In a locomotive, this device can be assembled inside of the cab for blowing traction motors, with the axial flow blower being supported by the cylindrical duct 1, which in turn rests directly on the under-frame of the cab. The air thus flows vertically downward and then horizontally and radially into the under-frame without any pressure loss. The lower duct 9 therefore may actually be the substantially enclosed hollow under-frame of the locomotive cab, through which the ventilating air is blown by the axial flow blower 15 to openings which conduct the air directly to the traction motors.

It will now be readily seen that this invention provides an improved ventilating system characterized by the elimination of pressure drop in deflecting air from an axial flow blower about a right-angle bend, thus reducing the size of the blower and the power requirement of the driving motor for a given volume of air flow.

While we have shown and described a particular embodiment of this invention, further modifications and improvements will occur to those skilled in the art. We desire it to be understood, therefore, that this invention is not limited to the forms shown, and we intend in the appended claims to cover all modifications which do not depart from the spirit and scope of this invention.

What we claim as new and desire to secure by Letters Patent of the United States is:

1. A ventilating system comprising a first duct, a driving means mounted on one end of said first duct and closing said one end, an axial flow blower operably connected to said means and mounted in said first duct to force said air into and axially through said first duct, a plurality of openings formed in the circumferential surface of said first duct between said means and said blower for admitting air into the interior of said duct, a second duct arranged substantially at right angles to said first duct and communicating with the other end thereof to receive air therefrom, axially extending vanes mounted transversely in said first duct to reduce swirling motion of the air initiated by said blower, a first conical member positioned axially within said first duct secured to said vanes and having its base adjacent to said blower on the side remote from said openings with its apex end adjacent said other end, said base having a cross-sectional area approximately half that of said first duct and said apex end having a cross-sectional area less than a tenth of the cross-sectional area of said first duct thereby defining a diverging annular passage with the interior wall of said first duct whereby said air is substantially decelerated in said first duct to provide an increase in static pressure, and a second conical member in said second duct having its base resting on an interior wall of said second duct remote from said cylindrical duct, its apex end within said second duct and being coaxial with said first conical member thereby to reduce the kinetic energy loss during the deflection of the decelerated air, said second conical member having an outer surface that is at an angle of substantially 45 degrees with respect to its axis, said surface defining with the lower edge of said first duct a continuously expanding duct in the region of the deflection of said air.

2. The ventilating system as defined in claim 1 in which the apices of said first conical member and said second conical member are respectively connected by a cylindrical member thereby to facilitate the change of direction of said air.

3. The ventilating system as defined in claim 1 in which the first duct is cylindrical.

References Cited in the file of this patent

UNITED STATES PATENTS

| | | |
|---|---|---|
| Re. 5,154 | Swain | Nov. 19, 1872 |
| 839,757 | Hatfield | Dec. 25, 1906 |
| 1,153,872 | Matsler | Sept. 14, 1915 |
| 1,321,538 | Moody | Nov. 11, 1919 |
| 1,502,062 | Schmidt | July 22, 1924 |
| 1,681,712 | Taylor | Aug. 21, 1928 |
| 1,694,214 | Ginder | Dec. 4, 1928 |
| 2,190,937 | Demuth | Feb. 20, 1940 |
| 2,504,472 | Alsburg et al. | Apr. 18, 1950 |
| 2,620,230 | Hait | Dec. 2, 1952 |
| 2,626,101 | Curley | Jan. 20, 1953 |